(12) United States Patent
Bogner et al.

(10) Patent No.: US 10,576,715 B2
(45) Date of Patent: Mar. 3, 2020

(54) FLOORING BOARD WITH A THIN VENEER WOOD AESTHETIC AND DURABLE SURFACE

(71) Applicant: Aladdin Manufacturing Corporation, Calhoun, GA (US)

(72) Inventors: Harry Bogner, Calhoun, GA (US); Dick Quinlan, Calhoun, GA (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 581 days.

(21) Appl. No.: 14/796,543

(22) Filed: Jul. 10, 2015

(65) Prior Publication Data
US 2017/0008258 A1    Jan. 12, 2017

(51) Int. Cl.
*B32B 21/04*    (2006.01)
*E04F 15/04*    (2006.01)
(Continued)

(52) U.S. Cl.
CPC ............ *B32B 21/042* (2013.01); *B32B 21/02* (2013.01); *B32B 21/14* (2013.01); *B32B 37/14* (2013.01); *E04F 15/042* (2013.01); *B32B 2262/067* (2013.01); *B32B 2307/536* (2013.01); *B32B 2317/16* (2013.01); *B32B 2419/04* (2013.01)

(58) Field of Classification Search
CPC ....... B32B 21/02; B32B 21/042; B32B 21/14; B32B 2262/067; B32B 2307/536; B32B 2317/16; B32B 2419/04; B32B 37/14; E04F 15/042; E04F 13/0866; E04F 13/10; E04F 15/02; E04F 15/04; E04F 15/045
See application file for complete search history.

(56) References Cited

U.S. PATENT DOCUMENTS 2,412,534 A    12/1946  Randall
2,831,793 A    4/1958   Elmendorf
(Continued)

FOREIGN PATENT DOCUMENTS

AU    2011236087 A1    5/2013
BE      1019453 A3      7/2012
(Continued)

OTHER PUBLICATIONS

The Wood Database, www.wood-database.com/sweetgum, accessed Feb. 2, 2018.*
(Continued)

*Primary Examiner* — Frank J Vineis
*Assistant Examiner* — Alicia J Sawdon
(74) *Attorney, Agent, or Firm* — Alston & Bird LLP

(57) ABSTRACT

A flooring board having a plurality of layers may have a sufficiently high modified Janka hardness rating for use in general flooring applications. The flooring board may comprise a fiberboard core layer having a thin veneer layer of a natural wood species adhered to a surface of the core layer. The veneer layer may be a gymnosperm (softwood) or angiosperm (hardwood) having a low Janka hardness rating. Surprisingly, the flooring board has a high modified Janka hardness rating significantly higher than the Janka hardness rating of the natural wood species and sufficient for use in general flooring applications when the veneer layer is sufficiently thin.

21 Claims, 4 Drawing Sheets

(51) Int. Cl.
  *B32B 37/14* (2006.01)
  *B32B 21/14* (2006.01)
  *B32B 21/02* (2006.01)

(56) References Cited

U.S. PATENT DOCUMENTS

| | | | |
|---|---|---|---|
| 3,287,203 | A | 11/1966 | Elmendorf |
| 3,658,622 | A * | 4/1972 | Horowitz ............... C09J 161/34 156/331.9 |
| 4,031,276 | A | 6/1977 | Nakamura et al. |
| 5,492,756 | A * | 2/1996 | Seale ....................... B27N 3/00 428/326 |
| 5,755,068 | A | 5/1998 | Ormiston |
| 5,925,211 | A | 7/1999 | Rakauskas |
| 6,162,312 | A | 12/2000 | Abney |
| 6,402,869 | B1 | 6/2002 | von Haas |
| 6,769,219 | B2 | 8/2004 | Schwitte et al. |
| 6,880,307 | B2 | 4/2005 | Schwitte et al. |
| 7,597,947 | B2 | 10/2009 | Schuster |
| 7,669,879 | B2 | 3/2010 | Dykema |
| 2002/0170258 | A1 | 11/2002 | Schwitte et al. |
| 2003/0037504 | A1 | 2/2003 | Schwitte et al. |
| 2003/0148135 | A1 | 8/2003 | Ellstrom |
| 2005/0136234 | A1 | 6/2005 | Hak et al. |
| 2005/0268571 | A1 | 12/2005 | Magnusson |
| 2006/0070325 | A1 | 4/2006 | Magnusson |
| 2006/0234009 | A1 | 10/2006 | Roh et al. |
| 2007/0102108 | A1 * | 5/2007 | Zheng ....................... B27D 1/04 156/272.2 |
| 2008/0271842 | A1 * | 11/2008 | Schoning ................. B05D 7/08 156/275.5 |
| 2009/0155612 | A1 | 6/2009 | Pervan et al. |
| 2009/0223162 | A1 * | 9/2009 | Chen ....................... E04F 15/02 52/588.1 |
| 2010/0199831 | A1 | 8/2010 | Hiraku et al. |
| 2010/0313511 | A1 | 12/2010 | Thiers |
| 2011/0220271 | A1 | 9/2011 | Fyie et al. |
| 2012/0315452 | A1 | 12/2012 | Kim et al. |
| 2015/0197943 | A1 | 7/2015 | Ziegler et al. |

FOREIGN PATENT DOCUMENTS

| | | |
|---|---|---|
| CN | 1202949 C | 5/2005 |
| CN | 1281391 C | 10/2006 |
| CN | 103522384 A | 1/2014 |
| CN | 104309229 A | 1/2015 |
| DE | 10245914 A1 | 4/2004 |
| DE | 102007043202 A1 | 3/2009 |
| DE | 202013012020 U1 | 3/2015 |
| EP | 1761370 B1 | 12/2008 |
| EP | 2013034 A2 | 1/2009 |
| EP | 2065183 A1 | 6/2009 |
| EP | 2415947 A2 | 2/2012 |
| EP | 2805778 A1 | 11/2014 |
| GB | 785008 A | 10/1957 |
| GB | 807090 A | 1/1959 |
| GB | 2050941 A | 1/1981 |
| JP | S53-148506 A | 12/1978 |
| JP | H02-188206 A | 7/1990 |
| JP | H10-86107 A | 4/1998 |
| KR | 10-0768517 B1 | 10/2007 |
| KR | 2009-0006503 A | 1/2009 |
| KR | 2010-0111849 A | 10/2010 |
| KR | 2012-0070704 A | 7/2012 |
| NZ | 539188 A | 2/2007 |
| WO | WO 1997/047834 A1 | 12/1997 |
| WO | WO 1998/049248 A1 | 11/1998 |
| WO | WO 2001/051732 A1 | 7/2001 |
| WO | WO 2001/075247 A1 | 10/2001 |
| WO | WO 2003/087498 A1 | 10/2003 |
| WO | WO 2004/050359 A1 | 6/2004 |
| WO | WO 2007/149051 A1 | 12/2007 |
| WO | WO 2009/065769 A2 | 5/2009 |
| WO | WO 2009/124704 A1 | 10/2009 |
| WO | WO 2010/032080 A1 | 3/2010 |
| WO | WO 2010/122514 A3 | 12/2011 |
| WO | WO 2011/152787 A1 | 12/2011 |
| WO | WO 2012/004699 A2 | 1/2012 |
| WO | WO 2014/160938 A1 | 10/2014 |
| WO | WO 2015/078434 A1 | 6/2015 |
| WO | WO 2015/078443 A1 | 6/2015 |
| WO | WO 2015/078444 A1 | 6/2015 |
| WO | WO 2015/105456 A1 | 7/2015 |
| WO | WO 2015/154124 A1 | 10/2015 |
| WO | WO 2016/151435 A1 | 9/2016 |
| WO | WO 2017/001976 A1 | 1/2017 |

OTHER PUBLICATIONS

Ravenview—The Janka Hardness Scale (http://ravenview.com/blog/2007/11/05/the-janka-hardness-scale/) (Year: 2007).*
Augusta, Georgia—Sweetgum (https://www.augustaga.gov/1636/Sweetgum) (Year: 2014).*
Ashley River Lumber (http://arlumber.com/wood-species/) (Year: 2015).*
The Wood Databse, www.wood-database.com/poplar, accessed May 15, 2019.*
International Searching Authority, International Search Report and Written Opinion for International Application No. PCT/IB2016/054056, dated Sep. 26, 2016, 13 pages, European Patent Office, Netherlands.
Wikipedia Contributors, "Gum Tree," *Wikipedia, The Free Encyclopedia*, https://en.wikipedia.org/w/index.php?title=Gum_tree&oldid=698653386 (accessed Jan. 21, 2016).
Wikipedia Contributors, "Hardboard," Wikipedia, The Free Encyclopedia, https://en.wikipedia.org/w/index.php?title=Hardboard&oldid=669410617 (accessed Jan. 21, 2016).
Wikipedia Contributors, "Hardwood," *Wikipedia, The Free Encyclopedia*, https://en.wikipedia.org/w/index.php?title=Hardwood&oldid=699896920 (accessed Jan. 21, 2016).

* cited by examiner

FLOORING BOARD WITH A THIN VENEER WOOD AESTHETIC AND DURABLE SURFACE

BACKGROUND

Flooring materials to be installed in an aesthetic setting (e.g., a residential or commercial setting) are generally selected based at least in part on their appearance. For example, consumers and builders often utilize various types of flooring, including tile, carpet, hardwood flooring, laminate flooring, engineered wood flooring, and other types of flooring in order to enhance the aesthetics of the area in which they are installed. However, particularly in the case of hardwood flooring and alternatives thereto (including laminate flooring and engineered wood flooring), the selection of potential flooring materials is limited by the hardness of the materials utilized to manufacture the flooring materials. Because flooring materials are often subject to significant localized pressures during normal use (e.g., resulting from objects dropped onto the flooring material, persons walking in high-heeled shoes on the flooring material, and/or the like), the flooring materials must have a hardness rating sufficient to resist denting of the aesthetic surface of the flooring material caused by high localized pressures during normal use.

In light of the significant localized pressures experienced by flooring materials, the raw materials utilized in the flooring materials are tested to meet a minimum hardness prior to being used to construct the flooring materials. One well known test for solid wood is the Janka Hardness testing method as defined by American Society for Testing and Materials ("ASTM") in ASTM D 143. In addition, wood flooring materials are again tested in their final board form according to a modified Janka testing method (as explained in more detail below) to ensure that the aesthetic and durable surface of the completed flooring material has an adequate hardness to withstand the high localized pressures of normal use.

The hardness required to withstand the significant localized pressures experienced by flooring materials during normal use generally limits the use of certain species of wood having low hardness ratings. As an example, substantially all gymnosperm species (commonly referred to as "softwoods"), and certain angiosperm species (commonly referred to as "hardwoods") are considered to be unusable for flooring materials given their low hardness ratings. However, at least some of these species of wood can have an aesthetic appearance that is considered exotic, or is otherwise desirable, over traditionally used species of wood.

Accordingly, a need exists for flooring boards providing the desirable aesthetic appearance of gymnosperm and angiosperm wood species having low hardness ratings while at the same time meeting the hardness requirements to resist damage to the flooring boards during normal use in order to improve the selection of available flooring material options.

BRIEF SUMMARY

By adhering a sufficiently thin veneer layer of a gymnosperm or low-hardness angiosperm wood species to a surface of a fiberboard core layer such as an HDF or HDF material, a hard flooring board having the desirable appearance of gymnosperm or low-hardness angiosperm wood species is provided. Although the thin veneer layer may comprise a wood species having a low Janka hardness rating, the overall flooring board can have a sufficiently high modified Janka hardness rating to resist denting during normal use with a sufficiently thin veneer layer.

Various embodiments are directed to a flooring board comprising a fiberboard core layer, such as an HDF or MDF core layer, having a thickness between about 6.25 mm and about 6.75 mm and a veneer layer adhered to a side of the core layer such that the veneer layer defines an aesthetic and durable surface of the flooring board. The veneer layer comprises a natural wood species having a Janka side hardness rating between about 350 lbf and about 850 lbf when tested in block form, and a thickness between about 0.6 mm and about 2.0 mm when adhered to the core layer. The flooring board has a modified Janka hardness rating measured on the aesthetic and durable surface of the flooring board of at least about 120% of the Janka side hardness rating of the wood species tested in block form. In various embodiments, the flooring board has a modified Janka hardness rating measured on the aesthetic and durable surface of the flooring board of at least about 200% of the Janka side hardness rating of the wood species tested in block form. In various embodiments, the natural wood species of the veneer layer is a gymnosperm, such as pine or fir. In other embodiments, the natural wood species of the veneer layer is an angiosperm having a low Janka hardness rating when measured in block form, such as sweetgum, poplar, or aspen. Moreover, in various embodiments, the veneer layer is coated.

In various embodiments, the veneer layer has a thickness between about 0.6 mm and about 1.75 mm and has a modified Janka hardness rating measured on the aesthetic and durable surface of the flooring board of at least about 130% of the Janka side hardness rating of the wood species tested in block form. In various embodiments, the veneer layer has a thickness between about 0.6 mm and about 1.5 mm and has a modified Janka hardness rating measured on the aesthetic and durable surface of the flooring board of at least about 135% of the Janka side hardness rating of the wood species tested in block form. Moreover, in various embodiments the core layer has a thickness between about 6.25 mm and about 6.75 mm.

In various embodiments, the flooring board additionally comprises a backing layer adhered to the core layer on a side opposite the veneer layer. In various embodiments, the backing layer comprises a southern red oak, and has a thickness between about 0.96 mm and about 2.12 mm.

Various embodiments are directed to flooring board comprising a fiberboard core layer, such as an HDF or MDF core layer having a thickness between about 6.25 mm and about 6.75 mm and a veneer layer adhered to a side of the core layer such that the veneer layer defines an aesthetic and durable surface of the flooring board. The veneer layer comprises a gymnosperm, and has a thickness between about 0.6 mm and about 2.0 mm when adhered to the core layer. The flooring board has a modified Janka hardness rating of at least about 1,050 lbf measured on the aesthetic and durable surface of the flooring board. Moreover, in various embodiments, the veneer layer is coated.

In various embodiments, the veneer layer has a thickness between about 0.6 mm and about 1.75 mm, or between about 0.6 mm and about 1.5 mm. Moreover, in various embodiments the core layer has a thickness between about 6.25 mm and about 6.75 mm.

In various embodiments, the flooring board additionally comprises a backing layer adhered to the core layer on a side opposite the veneer layer. In various embodiments, the backing layer comprises a southern red oak, and has a thickness between about 0.96 mm and about 2.12 mm.

Various embodiments are directed to a flooring board comprising a fiberboard core layer, such as an HDF or MDF core layer having a thickness between about 6.25 mm and about 6.75 mm and a veneer layer adhered to a side of the core layer such that the veneer layer defines an aesthetic and durable surface of the flooring board. The veneer layer comprises sweetgum having a Janka side hardness rating of about 850 lbf, and has a thickness between about 0.6 mm and about 2.0 mm when adhered to the core layer. The flooring board has a modified Janka hardness rating measured on the aesthetic and durable surface of the flooring board of at least about 120% of the Janka side hardness rating of the sweetgum tested in block form. Moreover, in various embodiments, the veneer layer is coated.

In various embodiments, the veneer layer has a thickness between about 0.6 mm and about 1.75 mm and has a modified Janka hardness rating measured on the aesthetic and durable surface of the flooring board of at least about 130% of the Janka side hardness rating of the sweetgum tested in block form. In various embodiments, the veneer layer has a thickness between about 0.6 mm and about 1.5 mm and has a modified Janka hardness rating measured on the aesthetic and durable surface of the flooring board of at least about 135% of the Janka side hardness rating of the sweetgum tested in block form. Moreover, in various embodiments the core layer has a thickness between about 6.25 mm and about 6.75 mm.

In various embodiments, the flooring board additionally comprises a backing layer adhered to the core layer on a side opposite the veneer layer. In various embodiments, the backing layer comprises a southern red oak, and has a thickness between about 0.96 mm and about 2.12 mm.

Various embodiments are directed to a flooring board comprising a fiberboard core layer, such as an HDF or MDF core layer having a thickness between about 6.25 mm and about 6.75 mm and a veneer layer adhered to a side of the core layer such that the veneer layer defines an aesthetic and durable surface of the flooring board. The veneer layer comprises poplar having a Janka side hardness rating of about 540 lbf, and has a thickness between about 0.6 mm and about 2.0 mm when adhered to the core layer. The flooring board has a modified Janka hardness rating measured on the aesthetic and durable surface of the flooring board of at least about 200% of the Janka side hardness rating of the poplar tested in block form. Moreover, in various embodiments, the veneer layer is coated.

In various embodiments, the veneer layer has a thickness between about 0.6 mm and about 1.75 mm and has a modified Janka hardness rating measured on the aesthetic and durable surface of the flooring board of at least about 205% of the Janka side hardness rating of the poplar tested in block form. In various embodiments, the veneer layer has a thickness between about 0.6 mm and about 1.5 mm and has a modified Janka hardness rating measured on the aesthetic and durable surface of the flooring board of at least about 210% of the Janka side hardness rating of the poplar tested in block form. Moreover, in various embodiments the core layer has a thickness between about 6.25 mm and about 6.75 mm.

In various embodiments, the flooring board additionally comprises a backing layer adhered to the core layer on a side opposite the veneer layer. In various embodiments, the backing layer comprises a southern red oak, and has a thickness between about 0.96 mm and about 2.12 mm.

Various embodiments are directed to a flooring board comprising a fiberboard core layer, such as an HDF or MDF core layer having a thickness between about 6.25 mm and about 6.75 mm and a veneer layer adhered to a side of the core layer such that the veneer layer defines an aesthetic and durable surface of the flooring board. The veneer layer comprises aspen having a Janka side hardness rating of about 350 lbf, and has a thickness between about 0.6 mm and about 2.0 mm when adhered to the core layer. The flooring board has a modified Janka hardness rating measured on the aesthetic and durable surface of the flooring board of at least about 288% of the Janka side hardness rating of the aspen tested in block form. Moreover, in various embodiments, the veneer layer is coated.

In various embodiments, the veneer layer has a thickness between about 0.6 mm and about 1.75 mm and has a modified Janka hardness rating measured on the aesthetic and durable surface of the flooring board of at least about 300% of the Janka side hardness rating of the aspen tested in block form. In various embodiments, the veneer layer has a thickness between about 0.6 mm and about 1.5 mm and has a modified Janka hardness rating measured on the aesthetic and durable surface of the flooring board of at least about 315% of the Janka side hardness rating of the aspen tested in block form. Moreover, in various embodiments the core layer has a thickness between about 6.25 mm and about 6.75 mm.

In various embodiments, the flooring board additionally comprises a backing layer adhered to the core layer on a side opposite the veneer layer. In various embodiments, the backing layer comprises a southern red oak, and has a thickness between about 0.96 mm and about 2.12 mm.

Various embodiments are directed to a method of manufacturing a flooring board comprising steps for providing a core layer comprising a fiberboard material; adhering a veneer layer to a side of the core layer such that the veneer layer defines an aesthetic and durable surface of the flooring board wherein the veneer layer defines an aesthetic and durable surface of the flooring board wherein the veneer layer comprises a natural wood species having a Janka side hardness rating between about 350 lbf and about 850 lbf when tested in block form, such as a gymnosperm, sweetgum, poplar, or aspen; and reducing the thickness of the veneer layer to a final thickness between about 0.6 mm and about 2.0 mm by sanding or other reducing methods such that the flooring board has a modified Janka hardness rating measured on the aesthetic and durable surface of the flooring board of at least about 120% of the Janka side hardness rating of the wood species tested in block form. In various embodiments, the veneer layer is reduced to a final thickness between about 0.6 mm and about 1.75 mm, and in certain embodiments the veneer layer is reduced to a final thickness between about 0.6 mm and about 1.5 mm.

Moreover, various embodiments additionally comprise steps for coating the aesthetic and durable surface with a coating. In certain embodiments, the method of manufacturing a flooring board additionally comprises adhering a backing layer to a second side of the core layer opposite the veneer layer. Moreover, various embodiments additionally comprise steps for forming a tongue-side and a groove-side opposite the tongue-side and generally perpendicular to the veneer layer on the core layer.

In various embodiments, adhering the veneer layer to the core layer comprises steps for applying an adhesive between the veneer layer and the core layer; cold pressing the veneer layer against the side of the core layer; and hot pressing the veneer layer against the side of the core layer to cure the adhesive.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
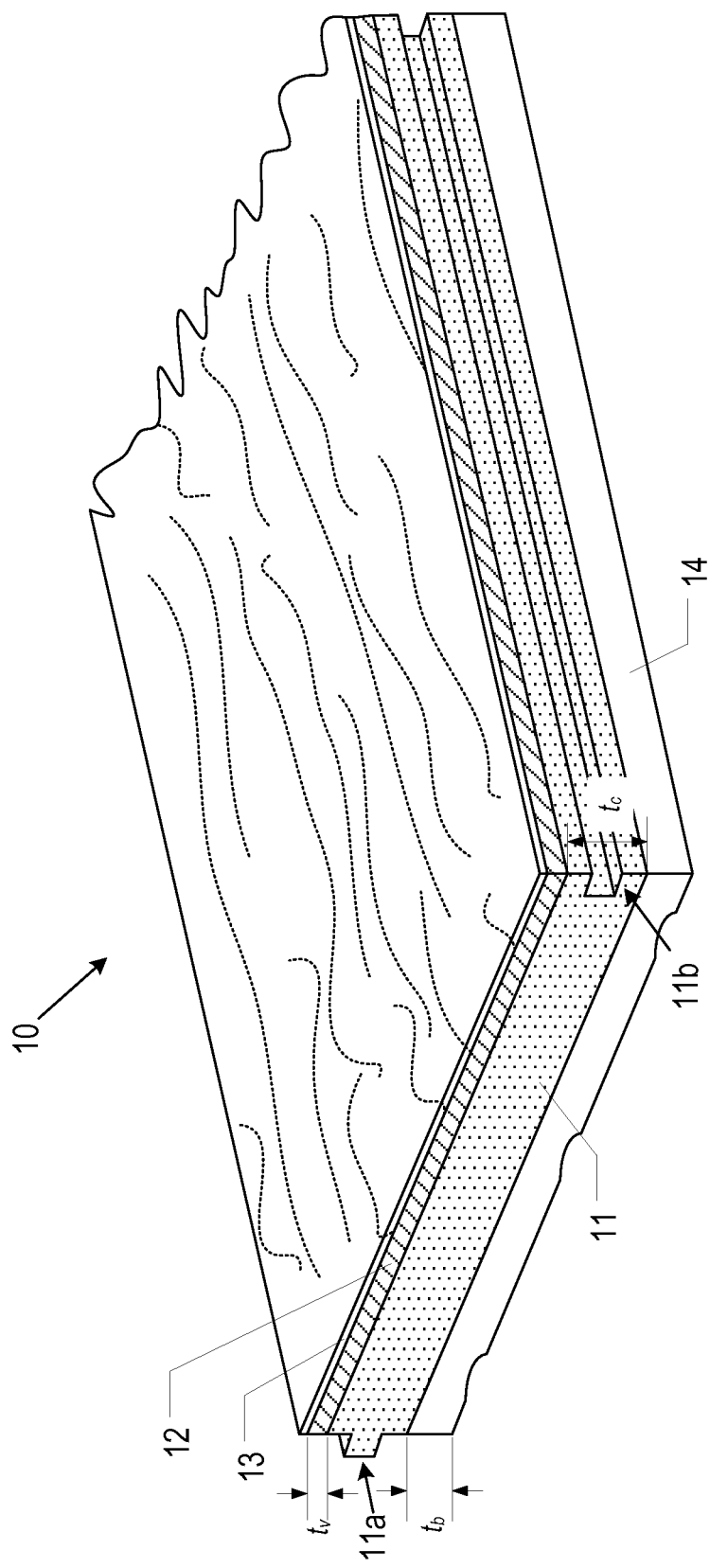
FIG. 1 is a perspective view of a flooring board according to various embodiments.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

The flooring boards described herein, as well as materials included in the flooring boards were tested to determine their hardness according to well-known hardness testing methods. The raw wood materials were tested according to the established Janka hardness testing method as described in ASTM D 143. In brief, the Janka hardness testing method measures the force required to embed an 11.28 mm (0.444 in) steel ball into a 6-inch long by 2-inch wide by 2-inch deep solid block of material to a depth equal to half the ball's diameter. The steel ball is pressed into the surface of the test block at a set velocity of 0.25 in/min. The amount of force necessary to embed the steel ball in the material to a depth equal to half the ball's diameter is the Janka hardness rating of the material. When testing the hardness of wood species, the Janka hardness testing method tests all sides of the solid block of wood to determine the side hardness rating (indicative of the hardness of the wood in a direction perpendicular to the grain of the wood) and end hardness rating of the wood (indicative of the hardness of the wood in a direction parallel to the grain of the wood). Because wood flooring generally includes wood having the grain parallel to the surface of the floor, the Janka side hardness rating of various wood species is often considered when determining whether the wood species is suitable for use as a flooring material.

For flooring boards that are not formed from a homogenous block of natural wood, a modified Janka hardness test (utilized by North Carolina State University) is commonly used to measure the hardness of a flooring board. The modified Janka hardness test may be used to measure the hardness of a flooring board, such as a laminate board, an engineered wood board, a solid wood board, and/or the like. Accordingly, the modified Janka hardness test may be utilized to measure the hardness of a board having one or more layers therein.

As utilized herein, the modified Janka test is substantially similar to the Janka test defined in ASTM D 143 and comprises steps for measuring the force required to embed an 11.28 mm steel ball into the aesthetic and durable surface of a flooring board. The modified Janka test comprises steps for moving the steel ball into the aesthetic and durable surface of the flooring board at 0.25 in/min, the same set velocity used in the Janka test defined in ASTM D 143. The amount of force necessary to embed the steel ball in the flooring board is the modified Janka hardness rating of the flooring board. Rather than testing various sides of a test sample as recited in the ASTM 143 standard, which would not yield useful results in the case of a nonhomogeneous flooring board, the modified Janka test method involves testing multiple points on the aesthetic and durable surface of the flooring board along the length of the flooring board.

Various embodiments of the present invention are directed to a flooring board having a thin veneer layer comprising a natural wood species adhered to a core layer. In various embodiments, the core layer may comprise a High-Density Fiberboard (HDF) or a Medium-Density Fiberboard (MDF). The veneer layer may comprise a wood having a low hardness rating determined according to the Janka test methods defined in ASTM D 143 (e.g., a gymnosperm or an angiosperm having a low hardness rating). Although the veneer layer may comprise a wood species having a low hardness that is itself generally insufficient to resist denting as a flooring material, when a sufficiently thin veneer layer is adhered to a solid core layer comprising fiberboard material, the overall flooring board combines the desirable and often exotic appearance of the wood species utilized in the veneer with a high modified Janka hardness adequate for general flooring applications.

As non-limiting examples, the veneer layer may comprise sweetgum having a Janka hardness rating in solid block form of about 850 lbf, poplar having a Janka hardness rating in solid block form of about 540 lbf, or aspen having a Janka hardness rating in solid block form of about 350 lbf. In embodiments, the veneer layer has a thickness between about 0.6 mm and about 2.0 mm, a thickness between about 0.6 mm and about 1.75 mm, or a thickness between about 0.6 mm and about 1.5 mm.

When the veneer layer is adhered to the core layer to form the flooring board, the flooring board has a modified Janka hardness rating substantially greater than the Janka side hardness rating of the wood species of the veneer layer alone when tested in sold block form. For example, a flooring board having a veneer layer of sweetgum may have a modified Janka hardness between about 1,075 lbf and about 1,170 lbf compared to a Janka side hardness rating of about 850 lbf for sweetgum when measured in block form. Accordingly, the flooring board may have an aesthetic and durable surface defined by a veneer layer of a wood species having a low Janka hardness rating while the aesthetic and durable surface of the overall flooring board has a high modified Janka hardness rating as determined using a modified Janka hardness test method. Thus, the flooring board provides the aesthetic qualities of a wood species having a low Janka side hardness rating while maintaining a high modified Janka hardness rating sufficient for use as a flooring board.

In various embodiments, the flooring board may have an elongated shape to define a plank, however, the flooring board may have any of a variety of shapes, including square, rectangular, triangular, and/or any other shape and may take the form of a tile. For example, the flooring board may have a shape permitting interlocking of a plurality of flooring boards to form a continuous flooring surface with no substantial gaps or holes extending between flooring boards.

As will be described in greater detail herein, various embodiments of the flooring board may additionally comprise a coating over the wood veneer (e.g., a polyurethane coating) and/or a backing layer adhered to the core layer on a surface opposite the veneer layer.

Flooring Board

Referring now to FIG. 1, which illustrates a perspective view of an end of a flooring board 10 according to various embodiments, the flooring board 10 comprises a plurality of layers of various materials. The flooring board 10 comprises a core layer 11 which may comprise a fiberboard material comprising compressed ground wood particles (e.g., fibers) and a binder material (e.g., a resin), such as an MDF or HDF. As a non-limiting example, a fiberboard core layer may have a Janka hardness rating of at least 900 lbf. For example, an HDF core layer may have a Janka hardness rating of about 965 lbf. However, other materials, having at least a medium or high Janka hardness may be utilized as a core layer material for various reasons including lower cost.

As illustrated in FIG. 1, the core layer 11 comprises at least a first surface and a second surface opposite the first surface and has a thickness $t_c$. For example, the core layer 11 may have a thickness between about 6.25 mm and about 6.75 mm. Moreover, as illustrated in FIG. 1, the core layer 11 may have a "tongue-and-groove" profile defined by a tongue 11a and a groove 11b. As shown in FIG. 1, the tongue 11a comprises a projection extending away from a third surface of the core layer 11 extending between and generally perpendicular to the first surface and the second surface, and the groove 11b comprises a channel in a fourth surface of the core layer 11 opposite the third surface and having a profile corresponding to the profile of the tongue 11a. Moreover, although not shown, the tongue 11a and groove 11b may have integrated mechanical locking elements configured to facilitate the connection of adjacent flooring boards 10. Example mechanical locking elements are described in U.S. Pat. No. 8,997,429 entitled "Floor Panels with Edge Connectors", which is incorporated by reference herein in its entirety. For example, the tongue 11a may have one or more protrusions extending away from the surface of the tongue 11a, and the groove 11b may have a plurality of recesses corresponding to the various protrusions of the tongue 11a.

Referring again to FIG. 1, the flooring board 10 comprises a veneer layer 12 adhered to the first surface of the core layer 11 to define an aesthetic and durable surface of the flooring board 10 visible when the flooring board 10 is installed. As illustrated in FIG. 1, the veneer layer 12 may cover the entire first surface of the core layer 11 such that the core layer 11 is not visible when the flooring board 10 is installed in association with a plurality of flooring boards 10 (e.g., as a flooring surface for a room). Accordingly, when installed with a plurality of flooring boards 10, the flooring boards provide the aesthetic appearance of the veneer layer 12.

In various embodiments, the veneer layer 12 may be a veneer formed from a natural wood species having a low Janka side hardness rating, such as a wood species having a Janka side hardness rating between about 350 lbf and about 850 lbf. The veneer layer may thus provide the aesthetic qualities of gymnosperms and low-Janka side hardness angiosperms to thereby provide an exotic or otherwise desirable appearance for the flooring board 10. In various embodiments, the veneer layer 12 is a veneer of a gymnosperm species (softwood), such as pine or fir. In various embodiments, the veneer layer 12 is a veneer of an angiosperm species (hardwood) having a Janka side hardness rating between about 350 lbf and about 850 lbf. For example, the veneer layer 12 is a veneer of aspen, poplar, or sweetgum. However, other species could also be used to provide a desirable appearance for an aesthetic and durable surface of a flooring board 10.

In embodiments, the veneer layer 12 has a thickness $t_v$ between about 0.6 mm and about 2.0 mm; a thickness $t_v$ between about 0.6 mm and about 1.75 mm; or a thickness $t_v$ between about 0.6 mm and about 1.5 mm. The thickness $t_v$ of the veneer layer 12 may be selected based at least in part on the ability to form a veneer of a particular wood species, the cost of the wood species, the hardness of the wood species, the size of visible pores extending through the wood species, the ability to form a veneer from a trunk of the wood species, the ability to perform further processing (e.g., sanding, planning, jointing, coating, and/or the like) on the wood species, and/or the like. For example, the veneer layer thickness $t_v$ may sufficiently thick the avoid cracking or splitting during processing.

As discussed in the testing section herein, it was determined that a flooring board 10 having a veneer layer 12 with a thickness $t_v$ less than about 2.0 mm has a hardness adequate for use in general flooring applications, and flooring boards 10 having thin wood veneers with a thickness $t_v$ less than about 1.75 mm provide exceptional strength for use in general flooring applications. For example, using the modified Janka test, a flooring board 10 having an HDF core layer 11 and a sweetgum veneer layer 12 having a thickness $t_v$ of about 1.62 mm was found to have a modified Janka hardness rating of about 1,078 lbf. As yet another example, a flooring board 10 having an HDF core layer 11 and a sweetgum veneer layer 12 having a thickness $t_v$ of about 1.21 mm was found to have a modified Janka hardness of about 1,161 lbf. As yet another example, a flooring board 10 having an HDF core layer 11 and a poplar veneer layer 12 having a thickness $t_v$ of about 1.40 mm was found to have a modified Janka hardness rating of about 1,148 lbf. As yet another example, a flooring board 10 having an HDF core layer 11 and an aspen veneer layer 12 having a thickness $t_v$ of about 1.5 mm was found to have a modified Janka hardness rating of about 1,109 lbf.

As shown in FIG. 1, in various embodiments, the aesthetic and durable surface of the veneer layer 12 opposite the core layer 11 can be coated with a coating 13. For example, the coating may be a polyurethane coating, wax coating, and/or the like. The coating 13 may provide additional surface protection to the veneer layer 12 against scratches and stains, while providing a desired level of luster to the flooring board 10. For example, the coating 13 may provide a high-gloss, semi-gloss, satin, or flat luster to the flooring board 10.

Moreover, in the illustrated embodiment of FIG. 1, the flooring board 10 comprises a backing layer 14 adhered to the second side of the core layer 11 opposite the veneer layer 12. The backing layer 14 may comprise a wood material (e.g., an angiosperm or a gymnosperm) or a fiberboard material (e.g., MDF or HDF). For example, the backing layer 14 may comprise a southern red oak plank. As an example, the backing layer may have a thickness $t_b$ between about 0.96 mm and about 2.12 mm. Moreover, the backing layer 14 may have one or more grooves extending along the length of the flooring board 10 to facilitate flexing of the flooring board 10.

Method of Manufacture

In various embodiments, the flooring board 10 may be manufactured by adhering the various layers through a cold-press and hot-press process. In various embodiments, the process may begin by obtaining a veneer layer 12 having an initial thickness. In various embodiments, the veneer layer 12 is adhered to the first surface of the core layer 11. If a backing layer 14 is additionally included in the flooring board 10, the backing layer 14 is adhered to the second surface of the core layer 11 opposite the veneer layer 12 either before or after the veneer layer 12 is adhered to the core layer 11. The combined core layer 11, veneer layer 12, and backing layer 14 with adhesive therebetween are cold pressed for a first period of time before the combined core layer 11, veneer layer 12, backing layer 14, and adhesive are heated and heat pressed for a second period of time to cure the adhesive between the various layers. However, the veneer layer 12 and the backing layer 14 may be adhered to the core layer 11 in separate steps (e.g., consecutively).

In various embodiments, after the adhesive is cured, the veneer layer 12 is reduced to a final thickness that is less than the initial thickness. For example, the veneer layer 12 may have an initial thickness of 1.75 mm when adhered to the core layer, and may have a final thickness less than 1.75 mm, but greater than 0.6 mm after reducing. The veneer layer 12 may be reduced in thickness by sanding the veneer layer 12 after it is adhered to the core layer 11. However, the veneer layer 12 may be reduced using a variety of other methods, such as planing and/or jointing the veneer layer 12 in addition to, or as an alternative to, the sanding.

After the thickness of the veneer layer 12 is reduced to the final thickness, one or more finishing processes may be performed on the combination of the core layer 11, veneer layer 12, and backing layer 14 to form the final flooring board 10. For example, the various layers may be cut to a desired length and/or width, tongue-and-groove features 11a, 11b may be machined (e.g., routed) into sides of the core layer 11, one or more coatings 13 may be applied to the surface of the veneer layer 12, and/or the like.

Hardness Testing Results

Several flooring boards 10 as described herein were tested according to the modified Janka test method described herein and utilized by North Carolina State University.

Surprisingly, by performing the modified Janka test on a plurality of flooring boards, it was found that a flooring board 10 having a veneer layer 12 with a thickness $t_v$ less than about 2.0 mm and adhered to a fiberboard core layer 11 has a modified Janka hardness rating sufficient for use as a flooring material. Further flooring boards 10 having a veneer layer having a thickness $t_v$ less than about 1.75 mm provide exceptional hardness for use as a flooring material. In contrast to conventional wisdom, by decreasing the thickness $t_v$ of the veneer layer 12, the overall hardness of the flooring board 10 having a fiberboard core layer 11 increases. Thus, flooring boards 10 having a veneer layer 12 of a wood species having a low hardness rating may have a modified Janka hardness rating greater than about 120% of the Janka hardness rating of the wood species measured in block form, or greater than about 200% of the Janka hardness rating of the wood species measured in block form. For example, a flooring board 10 comprising a sweetgum wood veneer layer 12 having a thickness of about 1.21 mm adhered to an HDF core layer 11 was determined to have a modified Janka hardness rating of about 1,161 lbf, compared to a Janka side hardness rating of about 850 lbf for the sweetgum wood species alone. As yet another example, a flooring board 10 comprising a poplar wood veneer layer 12 having a thickness of about 1.40 mm adhered to an HDF core layer 11 was determined to have a modified Janka hardness rating of about 1,148 lbf, compared to a Janka side hardness rating of about 540 lbf for the poplar wood species alone. As yet another example, a flooring board 10 comprising an aspen wood veneer layer 12 having a thickness of about 1.5 mm adhered to an HDF core layer 11 was determined to have a modified Janka hardness rating of about 1,109 lbf, compared to a Janka side hardness rating of about 350 lbf for the aspen wood species alone.

The modified Janka hardness test was performed on four sets of 30 sample flooring boards for each veneer layer natural wood species adhered to an HDF core layer having a Janka hardness of about 965 lbf, each set having a selected target veneer layer thickness. In total, 120 sample boards of varying thicknesses were tested at 4 sample locations along the length of each board, for a total of 480 measurements for each wood species utilized in the veneer layer. Each of the tested boards comprises a veneer layer of the tested wood species and thickness, an HDF core layer having an average thickness of about 6.41 mm, and a southern red oak backing layer having an average thickness of about 1.63 mm.

Figure 2:
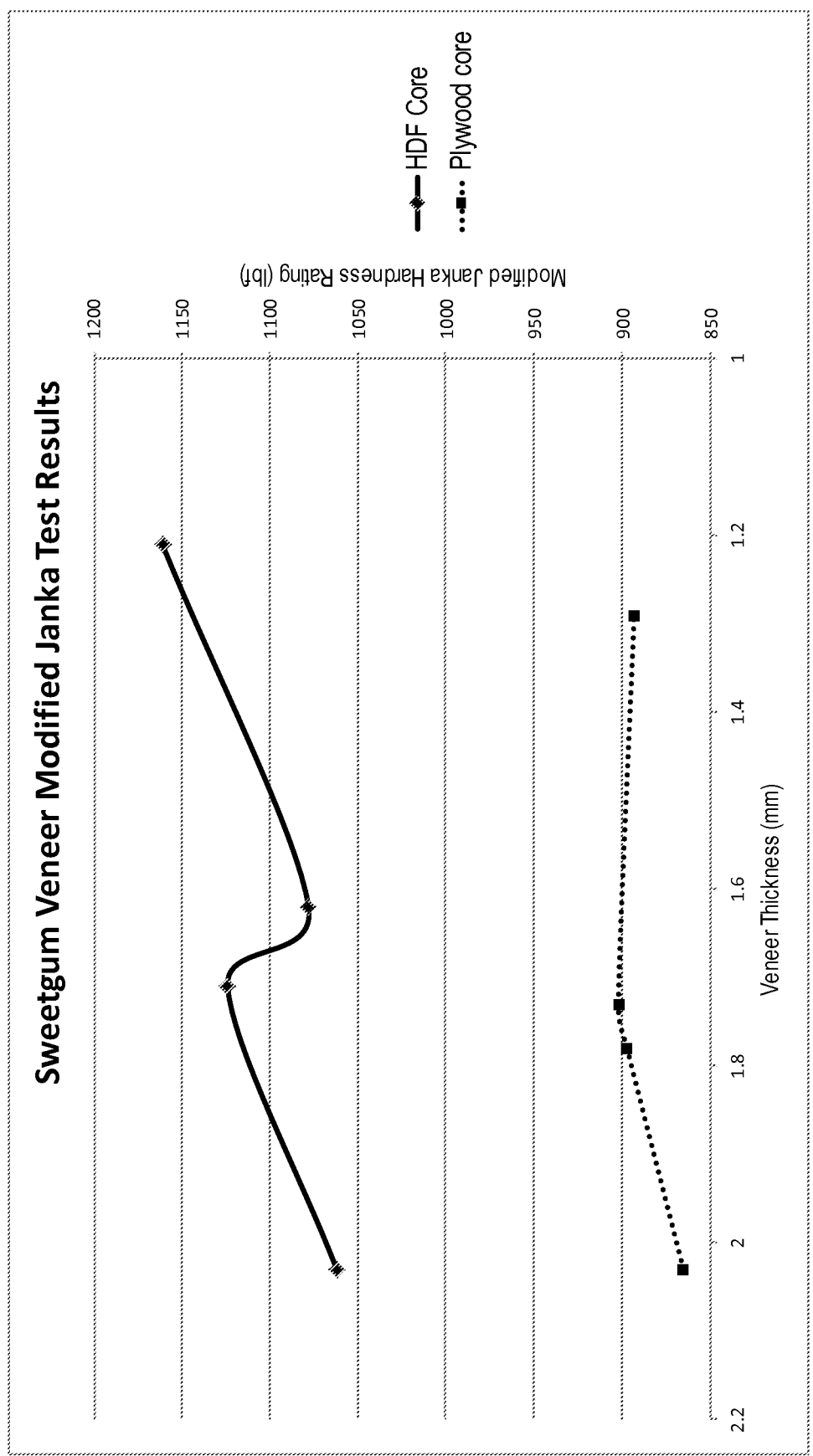
FIG. 2 is a graphical representation of hardness testing results for sample flooring boards having a sweetgum veneer layer.

Identical tests were performed on four sets of 30 sample boards for each veneer layer natural wood species adhered to a three-layer plywood core layer. The multi-layer plywood core layer included a first poplar layer adjacent the veneer layer having an average thickness of about 2.06 mm, a sweetgum center layer adhered to the first poplar layer having an average thickness of about 2.02 mm, and a second poplar layer adhered to the sweetgum center layer having an average thickness of about 2.07 mm. Each flooring board additionally included a southern red oak backing layer adhered to the plywood core layer and having an average thickness of about 1.73 mm. The results of the tests are summarized in Tables 1-3, below, and graphically in FIGS. 2-4. With reference to Tables 1-3, below, the average veneer thickness for each tested sample set is provided, along with the average modified Janka hardness for each sample set of flooring boards. For comparison, the Janka side hardness of the wood species of the veneer layer is provided, along with a hardness increase percentage representing the modified Janka hardness of the overall flooring board as a percentage of the Janka side hardness of the wood species of the respective veneer layers.

TABLE 1

Test results for flooring boards having a sweetgum veneer layer.

| Sample Name | Avg. Veneer Thickness (mm) | Avg. Modified Janka hardness (lbf) | Sweetgum Janka Side Hardness (lbf) | Hardness Increase |
|---|---|---|---|---|
| Sweetgum-HDF Sample Set 1 | 2.03 | 1062 | 850 | 123% |
| Sweetgum-HDF Sample Set 2 | 1.71 | 1124 | 850 | 131% |
| Sweetgum-HDF Sample Set 3 | 1.62 | 1078 | 850 | 125% |
| Sweetgum-HDF Sample Set 4 | 1.21 | 1161 | 850 | 135% |
| Sweetgum-Plywood Sample Set 1 | 2.03 | 865 | 850 | 101% |
| Sweetgum-Plywood Sample Set 2 | 1.78 | 897 | 850 | 104% |
| Sweetgum-Plywood Sample Set 3 | 1.73 | 902 | 850 | 105% |
| Sweetgum-Plywood Sample Set 4 | 1.29 | 893 | 850 | 104% |

TABLE 2

Test results for flooring boards having a poplar veneer layer.

| Sample Name | Avg. Veneer Thickness (mm) | Avg. Modified Janka hardness (lbf) | Poplar Janka Side Hardness (lbf) | Hardness Increase |
|---|---|---|---|---|
| Poplar-HDF Sample Set 1 | 1.93 | 1123 | 540 | 208% |
| Poplar-HDF Sample Set 2 | 1.77 | 1142 | 540 | 211% |
| Poplar-HDF Sample Set 3 | 1.55 | 1120 | 540 | 207% |
| Poplar-HDF Sample Set 4 | 1.40 | 1148 | 540 | 213% |
| Poplar-Plywood Sample Set 1 | 2.06 | 896 | 540 | 166% |
| Poplar-Plywood Sample Set 2 | 1.95 | 919 | 540 | 170% |
| Poplar-Plywood Sample Set 3 | 1.76 | 976 | 540 | 181% |
| Poplar-Plywood Sample Set 4 | 1.56 | 1015 | 540 | 188% |

TABLE 3

Test results for flooring boards having an aspen veneer layer.

| Sample Name | Avg. Veneer Thickness (mm) | Avg. Modified Janka hardness (lbf) | Aspen Janka Side Hardness (lbf) | Hardness Increase |
|---|---|---|---|---|
| Aspen-HDF Sample Set 1 | 2.06 | 1050 | 350 | 300% |
| Aspen-HDF Sample Set 2 | 1.96 | 1009 | 350 | 288% |
| Aspen-HDF Sample Set 3 | 1.54 | 1064 | 350 | 304% |
| Aspen-HDF Sample Set 4 | 1.5 | 1109 | 350 | 317% |
| Aspen-Plywood Sample Set 1 | 2.09 | 805 | 350 | 230% |
| Aspen-Plywood Sample Set 2 | 2.06 | 814 | 350 | 232% |
| Aspen-Plywood Sample Set 3 | 1.66 | 813 | 350 | 232% |
| Aspen-Plywood Sample Set 4 | 1.58 | 840 | 350 | 240% |

As shown in Tables 1-3, flooring boards 10 comprising a fiberboard core layer 11 and a veneer layer 12 of a wood species having a low Janka side hardness rating may have a modified Janka hardness rating higher than the wood species and sufficient for use as a flooring material. With specific reference to Table 1 and FIG. 2, flooring boards 10 comprising a fiberboard core layer 11 and a thin veneer layer 12 of sweetgum, which has a Janka side hardness rating of about 860 lbf when measured in block form, were found to have a modified Janka hardness rating measured on the aesthetic and durable surface greater than about 120% of the sweetgum Janka hardness rating.

Figure 3:
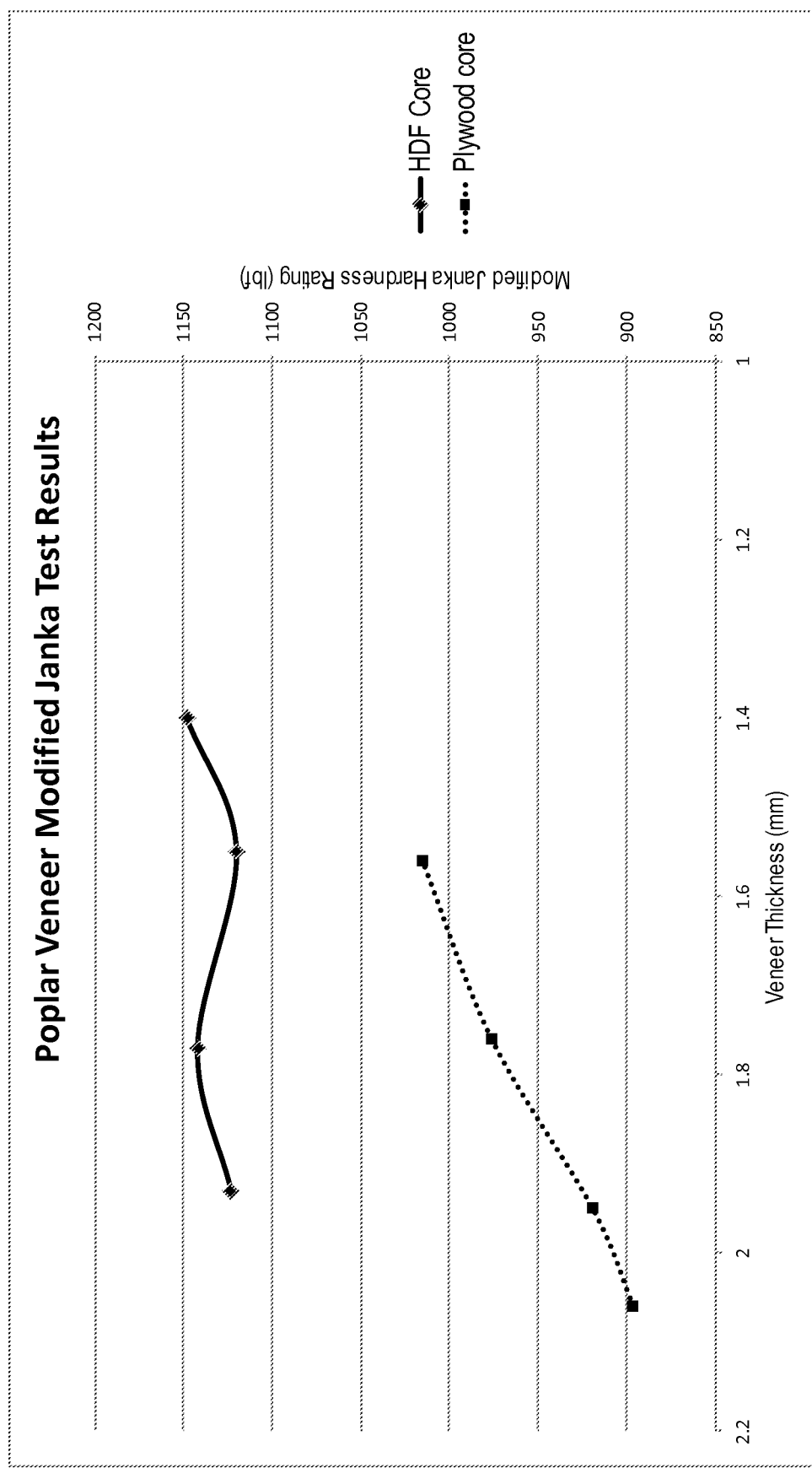
FIG. 3 is a graphical representation of hardness testing results for sample flooring boards having a poplar veneer layer.

Referring to Table 2 and FIG. 3 flooring boards 10 comprising a fiberboard core layer 11 and a thin veneer layer 12 of poplar, which has a Janka side hardness rating of about 540 lbf when measured in block form, were found to have a modified Janka hardness rating measured on the aesthetic and durable surface greater than about 200% of the poplar Janka hardness rating.

Figure 4:
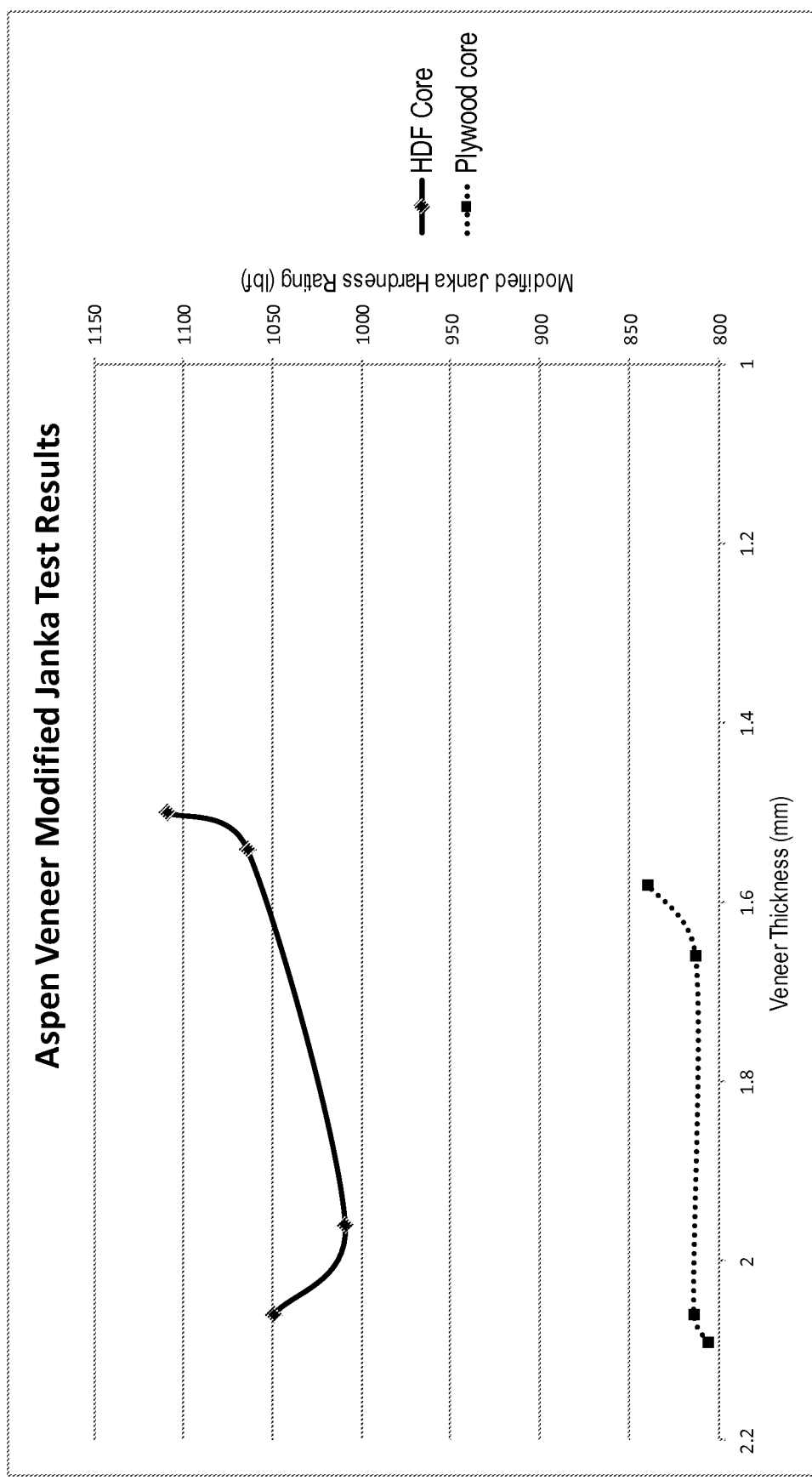
FIG. 4 is a graphical representation of hardness testing results for sample flooring boards having an aspen veneer layer.

Referring to Table 3 and FIG. 4, flooring boards 10 comprising a fiberboard core layer 11 and a thin veneer layer 12 of aspen, which has a Janka side hardness rating of about 350 lbf when measured in block form, were found to have a modified Janka hardness rating measured on the aesthetic and durable surface greater than about 288% of the aspen Janka hardness rating.

Such flooring boards 10 may thus provide an aesthetic and durable surface having a modified Janka hardness rating adequate to endure normal use associated with flooring materials (e.g., forces associated with persons walking on the flooring material in high-heel shoes), while providing the appearance of a gymnosperm or other low-hardness wood species. Flooring boards 10 having a fiberboard core layer 11 and a veneer layer 12 having a thickness between about 0.6 mm and about 2.0 mm may thus have a modified Janka hardness rating adequate for use as a flooring material. Advantageously, flooring boards having a fiberboard core layer 11 and a veneer layer 12 having a thickness between about 0.6 mm and about 1.75 mm provide a modified Janka hardness rating sufficient for use as a flooring material. Even more advantageously, flooring boards having a fiberboard core layer 11 and a veneer layer 12 having a thickness between about 0.6 mm and about 1.5 mm provide a modified Janka hardness rating sufficient for use as a flooring material Although described herein as generally used with gymnosperms and angiosperms having a low hardness rating, a veneer layer of any of a variety of wood species may be utilized in a flooring board 10 as described herein in order to provide a flooring board 10 having an aesthetic and durable surface having an enhanced hardness rating greater than the hardness of the wood species alone. For example, a veneer layer of Brazilian rosewood, cherry, maple, and/or the like may be utilized herein. Moreover, flooring boards 10 as described herein may comprise a veneer layer 12 of a wood material having an inconsistent Janka hardness rating across the surface of the material. For example, veneer layers of one or more figured wood varieties, ambrosia wood varieties, and/or spalted wood varieties may be utilized. As yet another alternative, the veneer layer 12 may comprise stabilized and/or impregnated wood varieties. Although wood species having a low Janka hardness rating need not be stabilized and/or impregnated with strengthening materials (e.g., resins) in order to provide a flooring board 10 having an aesthetic and durable surface having a high modified Janka hardness rating, the veneer layer 12 may be stabilized and/or impregnated to provide an alternative appearance of the flooring board 10.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:
1. A flooring board comprising:
a core layer comprising a fiberboard material, wherein said fiberboard material comprises compressed ground wood fibers and a binder material, and wherein said fiberboard material is selected from the group consisting of: medium-density fiberboard and high-density fiberboard;

a veneer layer adhered to the core layer such that the veneer layer defines an aesthetic and durable surface of the flooring board, wherein the veneer layer comprises a natural wood species having a Janka side hardness rating between about 350 lbf and about 850 lbf when tested in block form, and wherein the veneer layer has a thickness between about 0.6 mm and about 2.0 mm;

an adhesive heat-cured between the core layer and the veneer layer to secure the veneer layer to the core layer; and wherein the flooring board has a modified Janka hardness rating measured on the aesthetic and durable surface of the flooring board of at least about 120% of the Janka side hardness rating of the wood species tested in block form.

2. The flooring board of claim 1, wherein the natural wood species is a gymnosperm.

3. The flooring board of claim 2, wherein the natural wood species is selected from the group consisting of: pine and fir.

4. The flooring board of claim 1, wherein the natural wood species is selected from the group consisting of: sweetgum, poplar, and aspen.

5. The flooring board of claim 1, wherein the veneer layer has a thickness between about 0.6 mm and about 1.75 mm.

6. The flooring board of claim 5, wherein the flooring board has a modified Janka hardness rating measured on the aesthetic and durable surface of the flooring board of at least about 130% of the Janka side hardness rating of the wood species tested in block form.

7. The flooring board of claim 1, wherein the veneer layer has a thickness between about 0.6 mm and about 1.50 mm.

8. The flooring board of claim 7, wherein the flooring board has a modified Janka hardness rating measured on the aesthetic and durable surface of the flooring board of at least about 135% of the Janka side hardness rating of the wood species tested in block form.

9. The flooring board of claim 1, wherein the flooring board has a modified Janka hardness rating measured on the aesthetic and durable surface of the flooring board of at least about 200% of the Janka side hardness rating of the wood species tested in block form.

10. The flooring board of claim 1, wherein the core layer has a thickness between about 6.25 mm and about 6.75 mm.

11. The flooring board of claim 1, further comprising a backing layer adhered to a side of the core layer opposite the veneer layer.

12. The flooring board of claim 11, wherein the backing layer has a thickness between about 0.96 mm and about 2.12 mm.

13. A flooring board comprising:

a core layer comprising a fiberboard material;

a veneer layer adhered to the core layer such that the veneer layer defines an aesthetic and durable surface of the flooring board, wherein the veneer layer comprises sweetgum, and wherein the veneer layer has a thickness between about 0.6 mm and about 2.0 mm;

an adhesive heat-cured between the core layer and the veneer layer to secure the veneer layer to the core layer; and wherein the flooring board has a modified Janka hardness rating measured on the aesthetic and durable surface of the flooring board of at least about 120% of the Janka side hardness rating of the sweetgum tested in block form.

14. The flooring board of claim 13, wherein the sweetgum has a Janka side hardness rating of about 850 lbf measured in block form.

15. The flooring board of claim 13, wherein the veneer layer has a thickness between about 0.6 mm and about 1.75 mm.

16. The flooring board of claim 15, wherein the flooring board has a modified Janka hardness rating measured on the aesthetic and durable surface of the flooring board of at least about 130% of the Janka side hardness rating of the sweetgum tested in block form.

17. The flooring board of claim 13, wherein the veneer layer has a thickness between about 0.6 mm and about 1.50 mm.

18. The flooring board of claim 17, wherein the flooring board has a modified Janka hardness rating measured on the aesthetic and durable surface of the flooring board of at least about 135% of the Janka side hardness rating of the sweetgum tested in block form.

19. The flooring board of claim 13, wherein the core layer has a thickness between about 6.25 mm and about 6.75 mm.

20. The flooring board of claim 13, wherein the fiberboard material is selected from the group consisting of: medium-density fiberboard and high-density fiberboard.

21. The flooring board of claim 13, further comprising a backing layer adhered to a side of the core layer opposite the veneer layer.

* * * * *